(12) United States Patent
Sobrinski

(10) Patent No.: US 11,085,857 B2
(45) Date of Patent: Aug. 10, 2021

(54) TAILHOOK FOR TESTING AND EXERCISING AN AIRCRAFT ARRESTING CABLE

(71) Applicant: Joseph Sobrinski, Jackson, NJ (US)

(72) Inventor: Joseph Sobrinski, Jackson, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 193 days.

(21) Appl. No.: 16/655,853

(22) Filed: Oct. 17, 2019

(65) Prior Publication Data

US 2021/0116340 A1   Apr. 22, 2021

(51) Int. Cl.
 *G01N 3/02* (2006.01)
 *G01N 3/08* (2006.01)
 *B64F 1/02* (2006.01)
 *B64F 5/60* (2017.01)
 *B64C 25/68* (2006.01)

(52) U.S. Cl.
 CPC ............ *G01N 3/02* (2013.01); *G01N 3/08* (2013.01); *B64C 25/68* (2013.01); *B64F 1/029* (2020.01); *B64F 5/60* (2017.01)

(58) Field of Classification Search
 CPC .. G01N 3/02; G01N 3/08; B64F 1/029; B64F 5/60; B64C 25/68
 See application file for complete search history.

(56) References Cited

U.S. PATENT DOCUMENTS

| | | | | |
|---|---|---|---|---|
| 2,276,312 A | * | 3/1942 | Jurschick | B64C 25/68 244/110 G |
| 2,602,613 A | * | 7/1952 | Turner | B64C 25/68 244/110 G |
| 2015/0247770 A1 | * | 9/2015 | Nance | B64C 25/68 701/16 |

\* cited by examiner

*Primary Examiner* — Jonathan M Dunlap
(74) *Attorney, Agent, or Firm* — Mark O. Glut; NAWCAD

(57) ABSTRACT

A tailhook with a telescopic lever, a fixed jaw, a sliding jaw, a pivot arm, and a cam arm. The lever has a second lever and a first lever end attached to a ring to which a pulling force can be applied, which allows the tailhook to test and exercise an arresting cable. The sliding jaw and the fixed jaw communicate such that the arresting cable can be accepted and clamped. The second lever end is attached to the fixed jaw, while the fixed jaw includes a thumb screw that provides tension adjustment for the fixed jaw. The pivot arm provides a clamping force, and the cam arm provides a mechanical linkage between the fixed jaw and the sliding jaw such that when force is applied to the pivot arm, the cam arm moves the sliding jaw to clamp together or unclamp the fixed jaw and the sliding jaw.

1 Claim, 3 Drawing Sheets

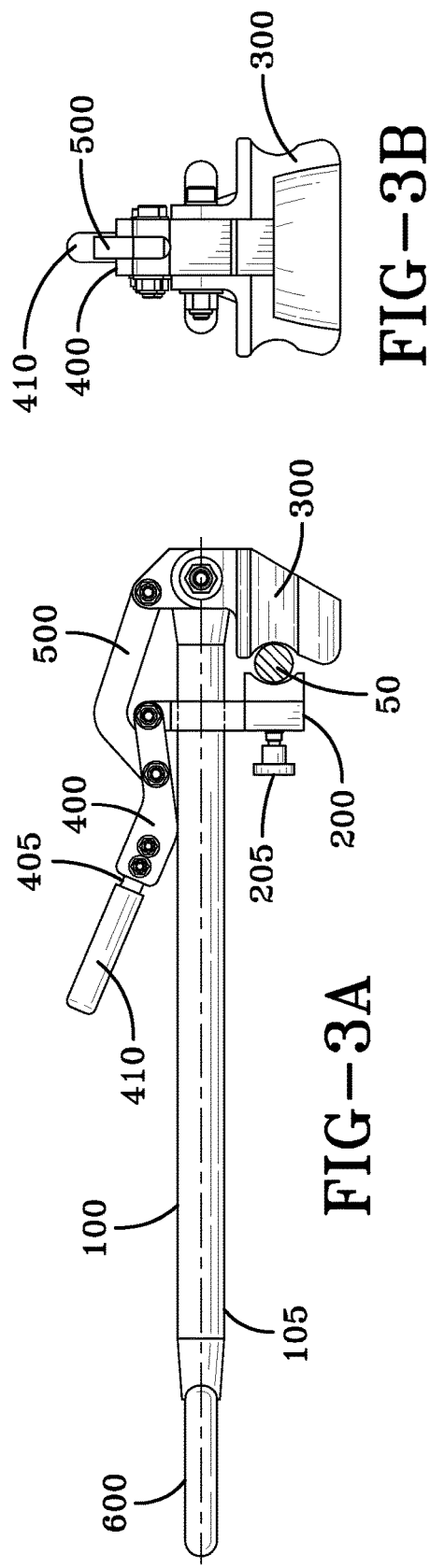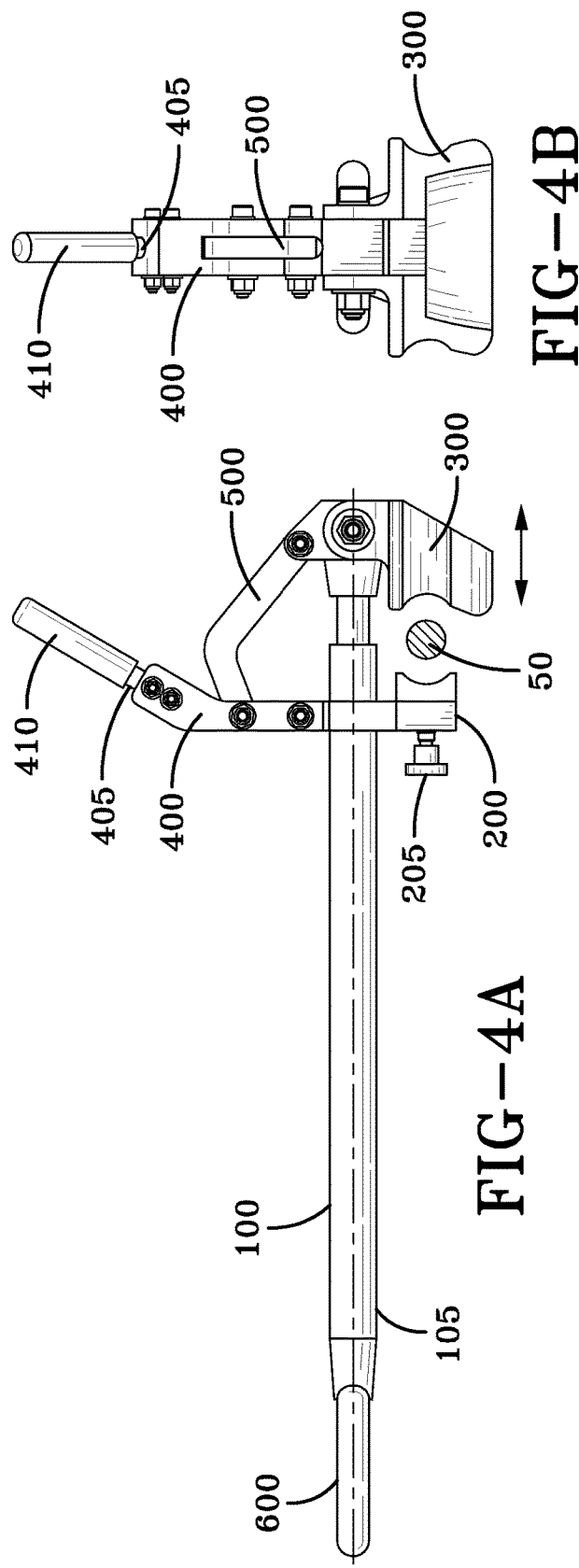

TAILHOOK FOR TESTING AND EXERCISING AN AIRCRAFT ARRESTING CABLE

STATEMENT OF GOVERNMENT INTEREST

The invention described herein may be manufactured and used by or for the Government of the United States of America for governmental purposes without payment of any royalties thereon or therefor.

BACKGROUND

Arresting cables, wires, or cross deck pendants are flexible steel cables, which are spanned across the landing area to be engaged by the arresting hook of an incoming aircraft. The arresting gear maintenance operation aboard United States aircraft carriers require that the military assess the mechanical integrity of the arresting gear prior to conducting flight operations, particularly, by requiring a task known as a pullout to be performed. A pullout is achieved by connecting a tailhook to the middle of the arresting cable on the hookpoint end, and connecting the opposite end to an aircraft tow tractor. The tractor then slowly pulls the cable down the flight deck, exercising the arresting gear. Due to asymmetric nature of the arresting gear system, the arresting cable is prone to slipping through the hookpoint, which eventually contacts the arresting cable terminal, causing damage, or requiring successive pullouts to complete a maintenance task.

Several methods have been attempted over the years to alleviate this slippage. One approach involved attaching cable clamps on either side of the hookpoint to prevent slipping. This approach was time consuming to set up, and mostly ineffective as the hookpoint would jump over the clamps and disconnect. A second approach was to install linear cable pullers used for commercial electrical cabling installation in place of the tailhook. This approach was also time consuming to set up, and had a tendency to damage the arresting cable, which is a critical safety item for flight operations. The most effective approach to date has been to tie a lifting strap around the hookpoint and arresting cable in a Prusik knot. A Prusik knot may be defined, but without limitation, as a friction hitch or knot used to attach a loop of cord around a rope or cable. While effective, the straps have a tendency to degrade during use, due to dragging along the flight deck or ground. Pieces of the strap will fall off over the life of the strap, causing debris to remain in the landing zone of the carrier. Debris on the flight deck is considered a significant hazard to aircraft and great care and effort is expended to keeping the flight deck debris free, negating some of the effectivity of this approach. Thus, a new and safer method for testing and exercising an aircraft arresting cable is needed.

SUMMARY

The present invention is directed to a tailhook for testing and exercising an aircraft arresting cable with the needs enumerated above and below.

The present invention is directed to a tailhook for testing and exercising an aircraft arresting cable. The tailhook comprising a lever, a fixed jaw, a sliding jaw, a pivot arm, and a cam arm. The lever has a first lever end and a second lever end, with the first lever end attached to a ring to which a pulling force can be applied, which allows the tailhook to test and exercise the arresting cable. The sliding jaw and the fixed jaw communicate such that the arresting cable can be accepted and clamped to prevent arresting cable slippage. The second lever end is attached to the fixed jaw, while the fixed jaw includes a thumb screw that provides tension adjustment for the fixed jaw. The pivot arm is for providing a clamping force, and the cam arm is for providing a mechanical linkage between the fixed jaw and the sliding jaw such that when force is applied to the pivot arm, the cam arm moves the sliding jaw to clamp together or unclamp the fixed jaw and the sliding jaw.

It is a feature of the present invention to provide a self-restricting, transverse slip reducing tailhook that causes minimal chance of cable damage, reduces installation time, and eliminates debris.

It is a feature of the present invention to provide self-restricting, transverse slip reducing tailhook that is easy to use and provides a more reliable and secure clamping method.

DRAWINGS

These and other features, aspects and advantages of the present invention will become better understood with reference to the following description and appended claims, and accompanying drawings wherein:

FIG. 3A is a side view of the tailhook in the closed or clamped position;

FIG. 3B is a rear view of the tailhook in FIG. 3A;

FIG. 4A is a side view of the tailhook in the open or unclamped position; and,

FIG. 4B is a rear view of the tailhook in FIG. 4A.

DESCRIPTION

Figure 1:
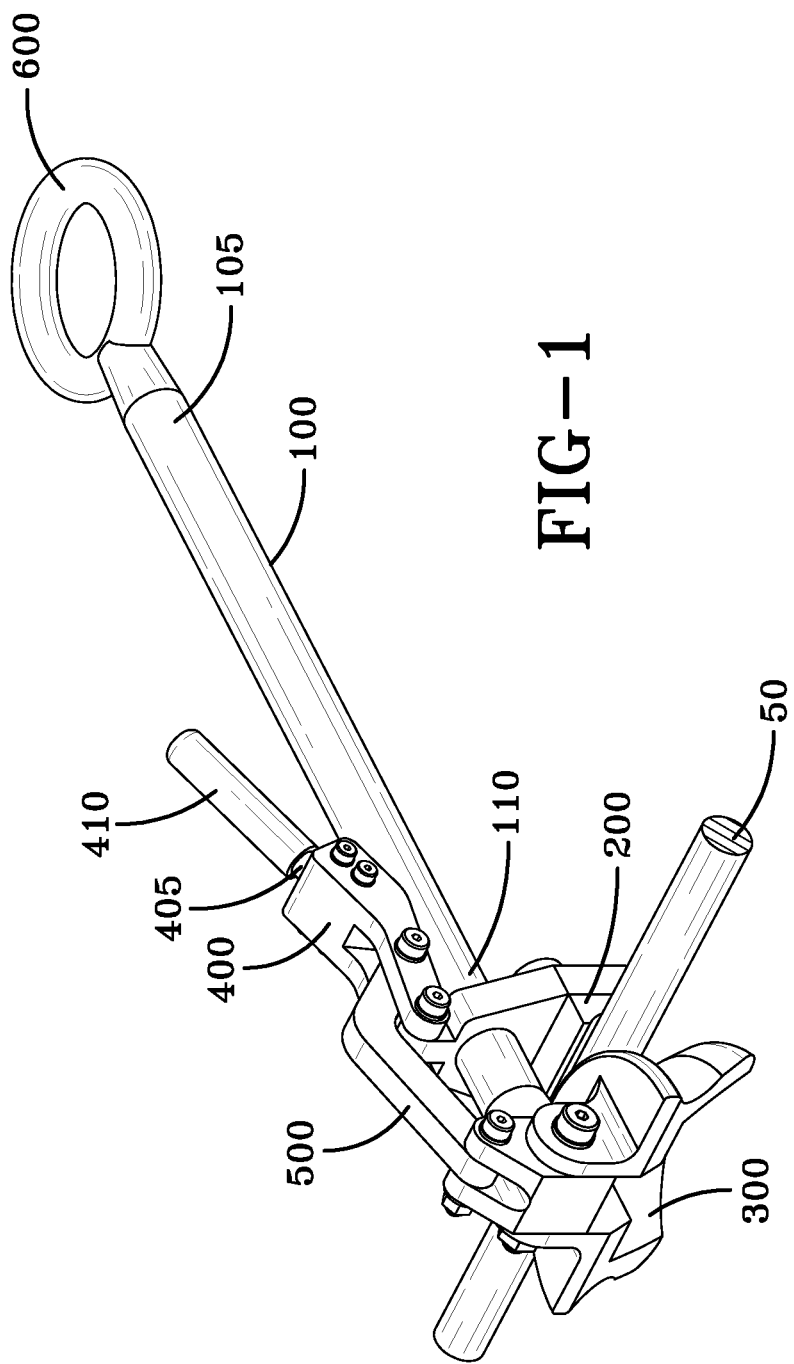
FIG. 1 is a perspective view of an embodiment of the tailhook for testing and exercising an aircraft arresting cable.
Figure 2:
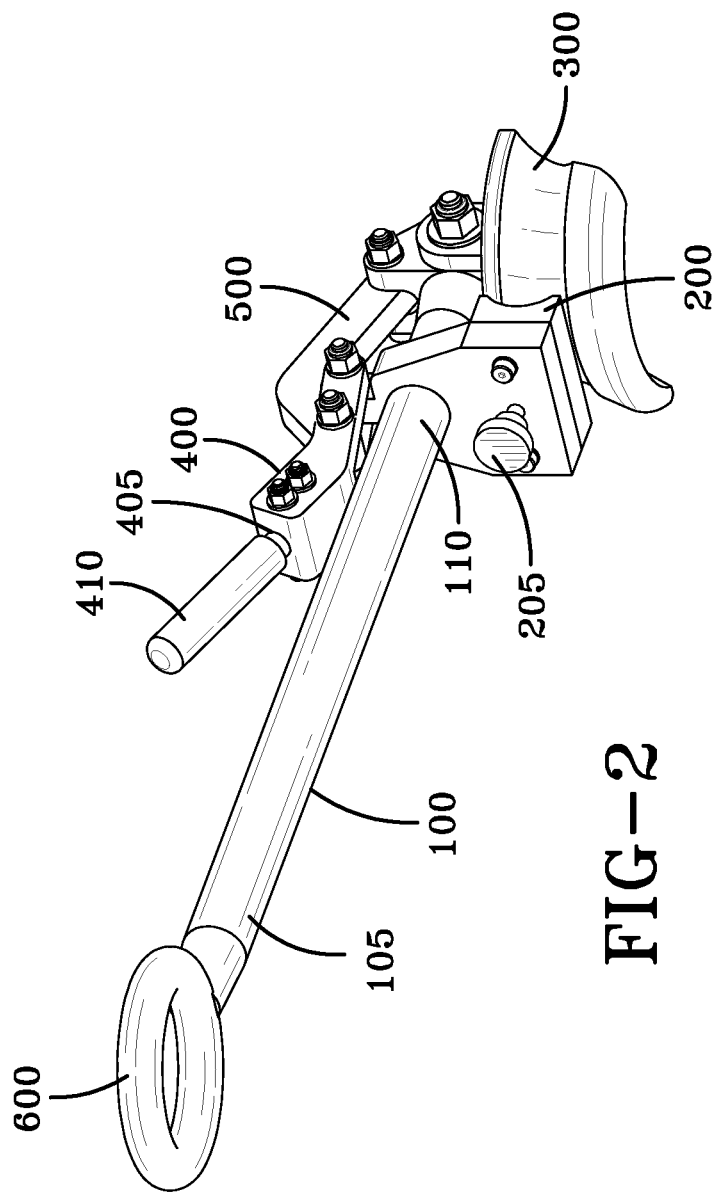
FIG. 2 is another perspective view of the tailhook.

The preferred embodiments of the present invention are illustrated by way of example below and in FIGS. 1-4. As seen in FIG. 1, a self-restricting, transverse slip reducing tailhook for testing and exercising an aircraft arresting cable 50 includes a telescopic lever 100, a fixed jaw 200, a sliding jaw 300, a pivot arm 400, and a cam arm 500. The lever 100 has a first lever end 105 and a second lever end 110, with the first lever end 105 attached to a ring 600 to which a pulling force can be applied, which allows the tailhook to test and exercise the arresting cable 50. The pulling force can, but without limitation, be a tractor, a vehicle, or any type of apparatus that can apply a pulling force on the tailhook. The sliding jaw 300 and the fixed jaw 200 communicate such the arresting cable 50 can accepted and clamped to prevent arresting cable 50 slippage. As seen in FIG. 2, the second lever end 110 is attached to the fixed jaw 200, while the fixed jaw 200 includes a thumbscrew 205 that provides tension adjustment for the fixed jaw 200. The pivot arm 400 is for providing a clamping force, and the cam arm 500 is for providing a mechanical linkage between the fixed jaw 200 and the sliding jaw 300 such that when force is applied to the pivot arm 400, the cam arm 500 moves the sliding jaw 300 linearly to clamp together or unclamp the fixed jaw 200 and the sliding jaw 300. The cam arm 500 permits enough rotation of the pivot arm 400 such that the dead center position (points of the joint in a line) is exceeded in the clamped position, providing self-restricting clamping force.

In the description of the present invention, the invention will be discussed in a military aircraft environment; however, this invention can be utilized for any type of application that requires use of a clamp.

As shown in FIGS. 1 and 2, in the preferred embodiment, the fixed jaw 200 and sliding jaw 300 are contoured such that the two jaws 200, 300 conform around the arresting cable 50. Each jaw 200, 300 may include semi-circular sections that conform around the arresting cable 50, such that in the closed or clamped position, the sections create a tight fit around the arresting cable 50 that does not allow slippage of the arresting cable 50 (shown in FIG. 3A). Each jaw 200, 300 is fabricated from a material that is softer than the arresting cable 50, in order to avoid damage to the arresting cable 50. The pivot arm 400 may further include a handle 405 with a gripping surface 410 such that a user can easily clamp or unclamp the two jaws 200, 300. Additionally, the pivot arm 400 may be rotationally attached to the cam arm 500 so that the sliding jaw 300 moves either toward the fixed jaw 200 to clamp the arresting cable 50 (shown in FIG. 3A) or away from the fixed jaw 200 to unclamp the arresting cable 50 (shown in FIG. 4A).

In operation, when the tailhook is in the open or unclamped position, an arresting cable 50 is positioned between the fixed jaw 200 and the sliding jaw 300, then force is applied on the pivot arm 400 via the handle 405. This causes the cam arm 500 to be actuated and pivot around a bolt, and translating the force to linear motion and causing the sliding jaw 300 to move toward the fixed jaw 200 via the telescopic lever 100 and secure the arresting cable 50 between the jaws 200, 300. The thumbscrew 205 can adjust the fixed jaw 200 to account for slight variations in the arresting cable 50 size, in order to ensure a tight fit. A pulling force apparatus, such as but without limitation, a towing vehicle, is then attached to the ring 600 by, but without limitation, a hitch or any other apparatus or method practi-cable. The pulling force is then applied to the tailhook to test and exercise the arresting cable 50.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A self-restricting transverse slip reducing tailhook for testing and exercising an aircraft arresting cable, the tailhook comprising:
   a telescopic lever having a first lever end and a second lever end, the first lever end attached to a ring to which a pulling force can be applied, which allows the tailhook to test and exercise the arresting cable;
   a fixed jaw and a sliding jaw, the sliding jaw and the fixed jaw communicating such that the arresting cable can be accepted and clamped to prevent arresting cable slippage, the second lever end attached to the fixed jaw, the fixed jaw including a thumb screw that provides tension adjustment for the fixed jaw;
   a pivot arm for providing a clamping force; and,
   a cam arm for providing a mechanical linkage between the fixed jaw and the sliding jaw such that when force is applied to the pivot arm, the cam arm moves the sliding jaw to clamp together or unclamps the fixed jaw and the sliding jaw.

\* \* \* \* \*